Oct. 27, 1942.   A. N. CLOUTIER   2,299,797
MECHANISM FOR AND METHOD OF DETERMINING THE PLATING
RELATIONS OF YARNS IN A KNITTED FABRIC
Filed July 28, 1937   3 Sheets-Sheet 1

INVENTOR:
ARTHUR N. CLOUTIER
By Roy F. Lovell
ATT'Y.

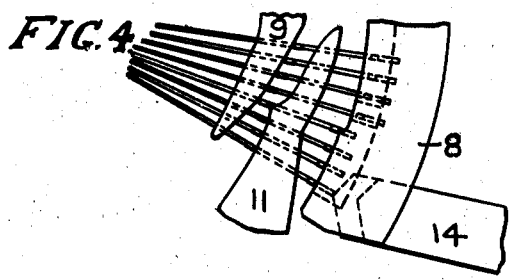
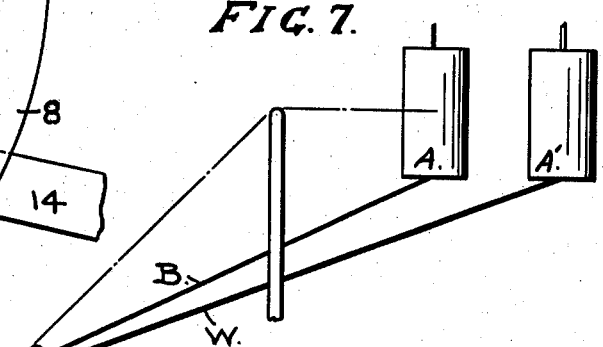
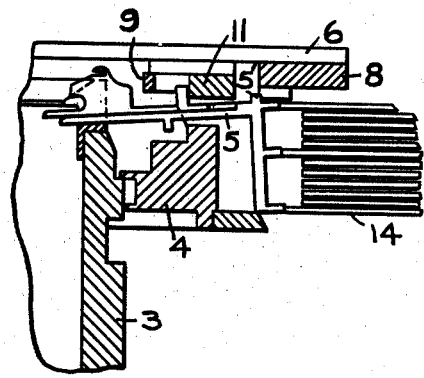
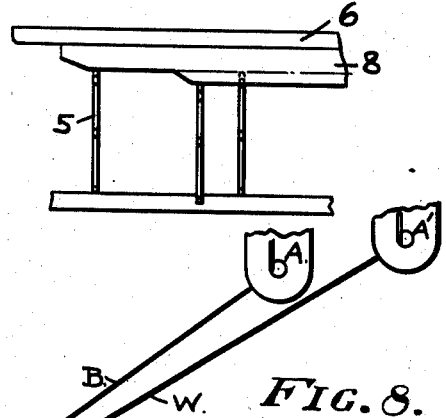
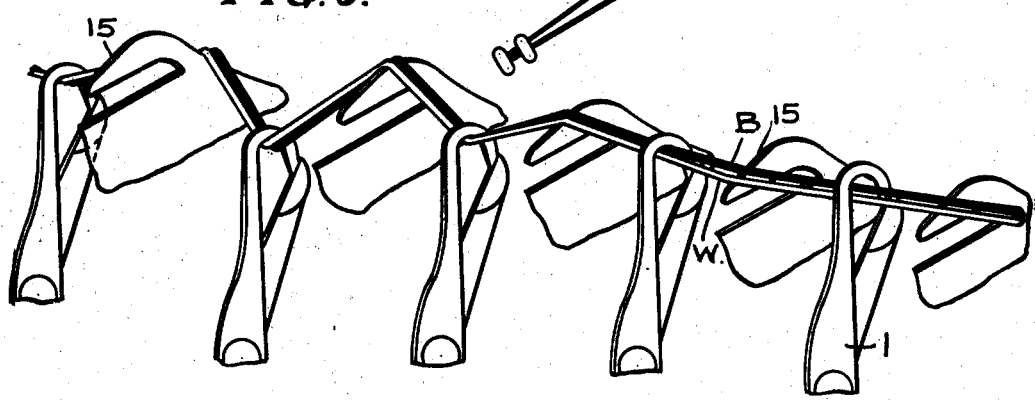
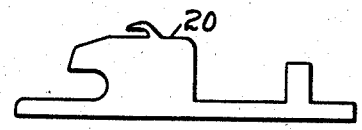

Oct. 27, 1942.  A. N. CLOUTIER  2,299,797
MECHANISM FOR AND METHOD OF DETERMINING THE PLATING
RELATIONS OF YARNS IN A KNITTED FABRIC
Filed July 28, 1937  3 Sheets-Sheet 3

INVENTOR:
ARTHUR N. CLOUTIER,
By Roy F. Lovell,
ATT'Y.

Patented Oct. 27, 1942

2,299,797

UNITED STATES PATENT OFFICE 2,299,797

MECHANISM FOR AND METHOD OF DETERMINING THE PLATING RELATIONS OF YARNS IN KNITTED FABRICS

Arthur N. Cloutier, Lonsdale, R. I., assignor to Hemphill Company, Central Falls, R. I., a corporation of Massachusetts Application July 28, 1937, Serial No. 156,185

16 Claims. (Cl. 66—107)

This invention relates to knitting machines and methods of knitting and more particularly to so-called sinkers and a control of movements thereof so that, in cooperation with companion needles, the sinkers may effect normal or reverse plating at will, the construction and operation of the sinkers being such that perfect normal plating is effected in conjunction with placing the tension or excess tension upon the body yarn as distinguished from placing tension or excess tension upon the plating yarn as is now common practice.

In the drawings:

Fig. 4 is a fragmentary view showing the jacks and sinkers at another stage of the knitting cycle and when the jacks are being selectively acted upon;

Fig. 5 is a fragmentary plan view partly in section and corresponding in phase to Fig. 4;

Fig. 6 is a fragmentary elevational view showing selected and non-selected jacks;

Fig. 7 is a fragmentary and more or less diagrammatic elevational view showing initial vertical yarn separation;

Fig. 8 is a view similar to Fig. 7 but illustrating the initial horizontal separation of the yarns;

Fig. 9 is an enlarged perspective view showing how the knitting of normal plating is effected;

Figure 15:
Figure 22:
Figure 16:
Figure 23:
Figure 17:
Figure 24:

Figs. 15, 16 and 17 are enlarged fragmentary views of the needle showing successive positions of yarns drawn in a previous course of knitting to effect plain or normal plating, Fig. 15 showing the yarns riding up the needle latch as the needle descends, Fig. 16 showing the yarns in a position to be knocked over by an advancing sinker (not shown), Fig. 17 showing the relative position of the needle loops after the same have been knocked over the top of the needle by the sinker and the needle has been again elevated;

Figs. 18, 19, 20 and 21 are views corresponding to Figs. 11, 12, 13 and 14 respectively, but showing the threads being acted upon to effect reverse plating;

Figs. 22, 23 and 24 are views similar respectively to Figs. 15, 16 and 17 showing the loops drawn in the previous course in a reverse plating relation; and Fig. 25 is a view of a modified form of sinker.

For convenience the needles 1 and sinkers 2 are shown as mounted respectively for sliding movements in a needle cylinder 3 and a sinker head 4. The sinkers 2 slide directly on top of companion jacks 5 which are likewise slidably mounted in the sinker head 4. In Banner machines such as shown in the Hemphill Patent #933,443, September 7, 1909, the needle cylinder 3 and sinker head 4 are rotated in unison being interconnected and rotatable with respect to cams mounted on or formed integrally with the lower face of a sinker cap plate 6. Also cams (not shown) act upon butts 7 of the needles 1 to effect the knitting of stitches in the usual or any well known manner as in Banner or similar machines, the cams being stationary.

The sinker cap plate 6 on the under face thereof has cams 8, 9, 10 and 11 which are fastened to the said sinker cap in any convenient manner. The cam 9 has a cutaway portion or recess as indicated at 12 to permit the butts 13 of the sinkers to be advanced to a greater extent than is otherwise possible and to be positioned to effect reverse plating as indicated in Fig. 19. The sinker butts 13 are shown at and adjacent to the recess 12, Fig. 3, in an advanced position to effect reverse plating as indicated in Figs. 18–21 whereas in Fig. 2 the butts 13 of the sinkers are shown in a relatively retracted position such as indicated in Figs. 11–14 so that normal or plain plating is knitted by the conjoint action of the needles and companion sinkers.

Figure 1:
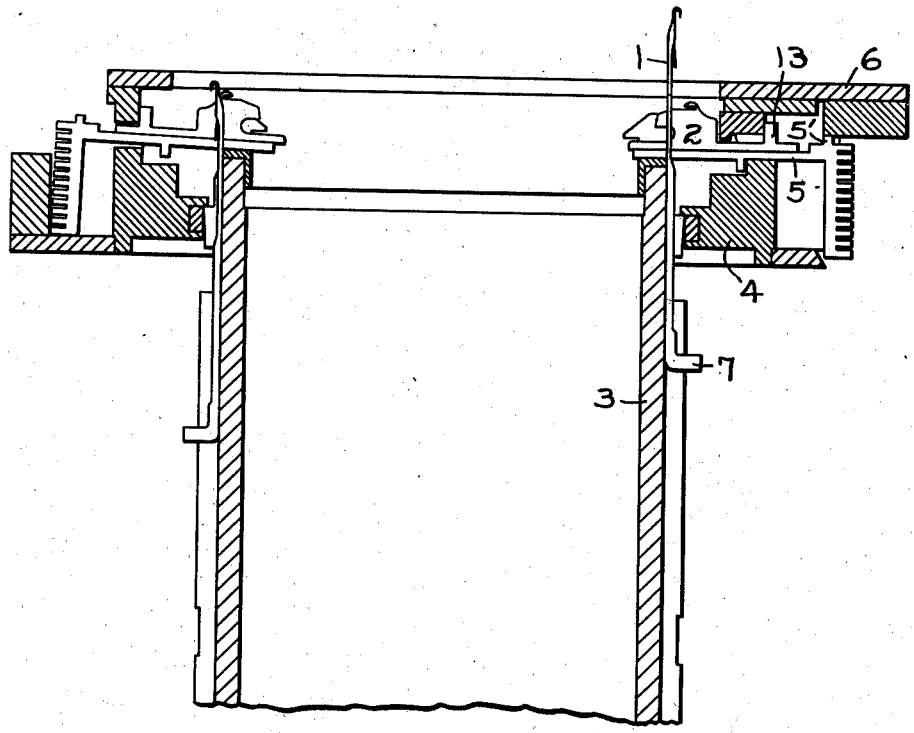
Fig. 1 is a sectional view through the sinker cap, sinker head and needle cylinder and showing needles and adjacent sinkers and jacks.
Figure 2:
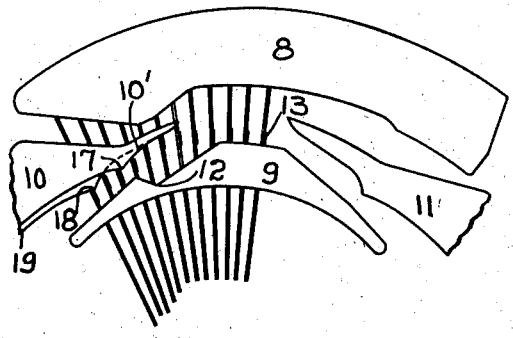
Fig. 2 is a fragmentary view of a portion of the sinker cams as they would be seen from above by removal of the top plate of the sinker cam means, all of the sinkers being shown as traversing a path to effect the knitting of normal plating.
Figure 3:
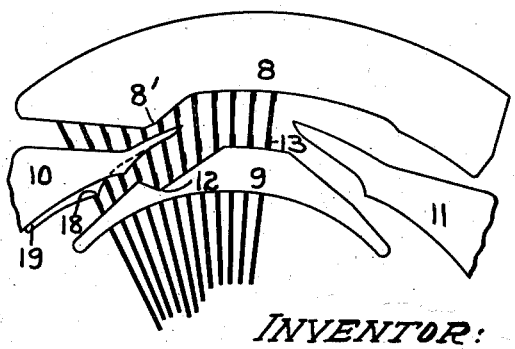
Fig. 3 is a fragmentary view similar to Fig. 2 but showing sinkers being advanced at an early time in the knitting cycle to effect so-called reverse plating.

The sinkers 2 are selected so that certain ones of them, at desired times, may move in the path indicated in Fig. 3 to effect reverse plating or in the path indicated in Fig. 2 to effect plain plating as by the jacks 5 which jacks are or may be acted upon by special cams 14 (Figs. 4 and 5) as indicated in Patent #2,052,777, September 1, 1936.

The sinkers may be controlled to effect reverse plating, Figs. 3 and 18-24, in the manner shown in the said Patent #2,052,777, but, as will now be described, the sinkers are controlled to effect the plain and normal plating of Figs. 2 and 11-17 in a manner somewhat different from that disclosed in the said patent.

Ordinarily to effect plating the plating or outside yarn or thread, i. e., the one that appears on the outer face of the fabric, is placed under tension or excess tension as compared with the tension placed upon the body or inside yarn or thread. The imposing of tension on the outside yarn necessarily shortens, to some extent, the loops of the plating yarn as a consequence of which the body yarn tends to show through to the outer face of the fabric, e. g., when plating black over white the plated area does not appear as solid black but has a somewhat greyish appearance. It will thus be understood that it would be preferable to impose a greater tension on the body yarn to effect a better coverage of the plating yarn over the body yarn but that is not possible in present day plating which is determined primarily by excess tension, i. e., the thread upon which is imposed the greatest tension will become the plating yarn and assume a position on the outer face of the fabric.

Present day coverage of one yarn by another is normally effected in a fairly satisfactory manner by imposing tension or excess tension on one of the yarns which, other things being equal, causes the excess tensioned yarn to appear on the outer face of the fabric and cover the other yarn. However, it is evident that if the loops of the fabric be knitted sufficiently tight the yarn on the outer face of the fabric will effectively cover the yarn on the inner face of the fabric regardless of the relative lengths of the loops of the two yarns; consequently, one consideration leading to or effecting a satisfactory coverage by one yarn with another is tight stitches, and a second consideration is the provision of longer loops on the covering yarn, that is, the yarn on the outside of the fabric. As will be hereinafter more specifically pointed out when reverse plating is effected, Figs. 3 and 18-24, the excess tension placed upon the body yarn B (outside yarn in reverse plated areas) draws the stitches so close together as to cause, in conjunction with the sinker construction and control, the body yarn B completely to cover the plating yarn W; and when normal or plain plating is effected, Figs. 2 and 11-17, the untensioned yarn or yarn with a less tension, i. e., the plating yarn, covers the body yarn by reason of the sinker construction control coupled with the longer loops of the plating yarn. In fabrics knitted in accordance with the present invention, the reverse plating, i. e., where the tensioned yarn is on the outside of the fabric, is perfect, that is, the tensioned body yarn completely hides or conceals the plating yarn; in the plain and normal plated areas, that is, where the untensioned plating yarn is on the outside of the tensioned body yarn, the longer loops of the plating yarn also completely cover the loops of the body yarn.

Figure 20:
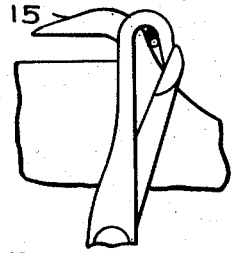

The plating yarn W and the body yarn B are fed from a yarn lever or levers in the mouthpiece (not shown) and in a separated plating relation, see Figs. 7 and 8, and as indicated in the patent to Lawson #1,605,895, November 2, 1926, attention being particularly directed to Figs. 16 and 20. In the Lawson patent tension or excess tension is placed on the lower yarn R whereas in the machine in which the present invention is practiced, tension or excess tension is placed upon the upper yarn corresponding in position to the yarn W of Figs. 16 and 20 of the Lawson patent.

Figure 12:
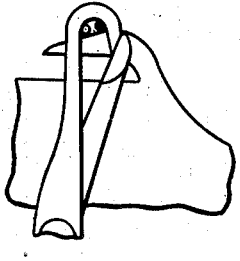

As hereinbefore indicated, and as illustrated in Figs. 3 and 18-24 inclusive, the yarns W and B are drawn over the backs of the sinker nibs to effect reverse plating by the descending needles in the manner shown in the Lawson Patent #2,052,777; however, to effect plain or normal plating the said yarns are caused to be engaged by a downwardly and inwardly inclined edge 15 on the nib of the sinker. The function of the sinker nib edge 15 is to engage the yarns when the needles, in their downward movement, arrive approximately at the position of Fig. 12, and thereby prevent a following (in the knitting cycle) sinker where reverse plating (Figs. 18-24) is to be effected from disturbing the normal plating relation of the threads in the hook of the needle, Fig. 12. In other words, whereas such following sinker, actuated as shown in Figs. 18-24, might otherwise cause the yarns to reverse their position in the hook of the needle, Fig. 12, such reversal from the position shown in Fig. 12, is prevented by causing the relatively high edge 15 on the sinker nib to engage and bind the yarns W and B and maintain them in their normal plating relation, i. e., as illustrated in Fig. 12. Thus the said edge 15 on the sinker nib by engaging the yarns at an earlier point in the knitting cycle than would be the case if the yarns were drawn as customarily over the edge of the sinker forward of the nib causes the threads to be bound or held and thus prevented from reversing at the adjacent needle.

Figure 13:
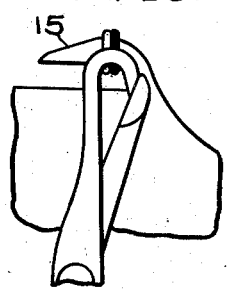
Figure 14:
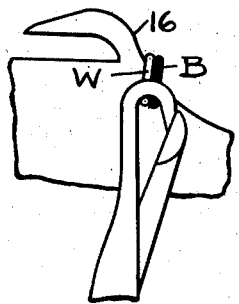

As indicated in Fig. 12 of the drawings, when the needle and sinker reach the relative positions shown in the figure, the plating relations of the yarns in the fabric are assured and the subsequent inward movement of the sinker and downward movement of the needle to the positions shown in Figs. 13 and 14, cannot disturb the plating relations of the yarns.

Figure 11:
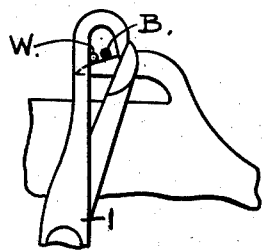
Figs. 11, 12, 13 and 14 are enlarged views showing a needle and companion sinker in successive phases when effecting the knitting of plain or normal plated stitches.

In addition to the advantages hereinbefore mentioned, the drawing of the yarns for plain plating over the nibs of the sinkers and as indicated in Figs. 11-13, serves another very important purpose in that it permits tension or excess tension to be placed upon the so-called body yarn or yarn that appears on the inside of the fabric in the plain plated areas.

Prior to this invention it was not possible to tension the body yarn and also to draw both yarns, for plain plating, over an edge or at substantially the same point on a companion sinker. In accordance with prior methods, if the yarns are drawn over the edge of the sinker forwardly of the nib thereof, satisfactory fabric with single needle reverse plating lines can be knitted, but in such a case it is not possible to impose a tension or excess tension on the body yarn as distinguished from the plating yarn for the reason that the said body yarn will displace the plating yarn and appear on the outside of the fabric and thus become the plating yarn in the plain or normal plated areas. In accordance with the present invention, the provision of an edge 15 on the sinker nib for effecting the knitting of plain plated stitches, serves the additional purpose of engaging the yarns, in the knitting cycle, prior to the time they would otherwise be engaged and as indicated in Fig. 9 with the result that tension or excess tension can be placed upon the body yarn without such tension or excess tension causing the tensioned yarn to appear on the outer face of the fabric in the plain or normal plated wales.

Figure 18:
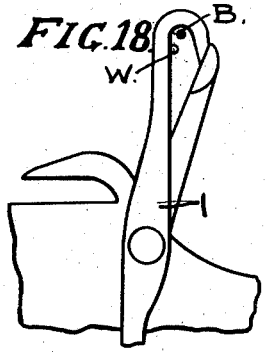
Figure 19:
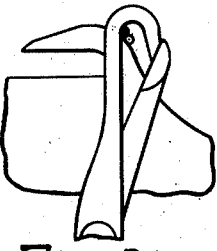

The foregoing result is accomplished by an initial horizontal and vertical separation of the yarns, i. e., as fed from the yarn levers A and A' as illustrated in Figs. 7 and 8, in combination with a rolling of the yarns both to effect plain plating, Figs. 11–14, and to effect reverse plating as illustrated in Figs. 18–21. As illustrated in Fig. 18, the yarn W is in engagement with the shank of the needle substantially opposite the bill of the hook thereof while the yarn B is spaced from the yarn W both vertically and horizontally. To effect plain plating the maximum horizontal separation of the yarns W and B would best serve the purpose, that is, the yarn B could be in engagement with the bill of the hook, Fig. 18. On the other hand, to effect reverse plating as illustrated in Figs. 18–21 inclusive, it would be preferable to have the white yarn W on the other side, in a horizontal sense from the yarn B and substantially in contact with the bill of the hook, Fig. 18. However, as the present invention is primarily concerned with optionally effecting plain plating or reverse plating, the horizontal separation of the yarns W and B is slight and preferably enough to compensate for the lesser rolling produced by the edge 15 of the sinker nib as compared with the rolling action performed by the outwardly and downwardly inclined edge 16 at the back of the sinker nib.

Figure 21:
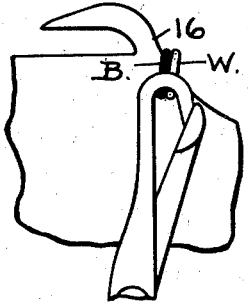

From the discussion in the preceding paragraph, it is evident that the horizontal separation of the yarns is subordinated, in importance, to a vertical separation of the yarns, i. e., lengthwise of the needle, which permits either the edge 15 of a sinker nib or the edge 16 of the sinker to act upon the yarn W and roll the same either to one side or to the other thus to effect reversal of the yarns in the needle hooks for plain plating as compared with reverse plating, attention being directed to Figs. 14 and 21.

The rolling of the yarns to effect plain plating, so as to cause the lower yarn W to be positioned adjacent to the shank of the hook as illustrated in Figs. 11–14 inclusive, is effected by forward movements of the sinkers as illustrated in the perspective view of Fig. 9, noting particularly the two sinkers at the right of said Fig. 9, the second sinker from the right having engaged the yarn W and positively moved the same to a position adjacent to the shank of the needle hook of the needle at the extreme right of Fig. 9. The aforesaid rolling action upon the yarns by the edges 15 of the sinker nibs is effected by that portion 10' of the cam 10 leading to the point 17 thereof which causes the sinkers to advance as they move from the right to the left of Fig. 9.

When effecting reverse plating over the backs of the sinker nibs, the yarns are rolled by a reverse movement of the sinkers as disclosed in the Lawson Patent #2,052,777, and by a movement of the sinker from the position illustrated in Fig. 18 to that illustrated in Fig. 20.

From the preceding description, it will be evident that to effect plain plating, the initial horizontal separation of the yarns W and B is relied upon to some extent as well as their vertical separation together with the rolling action of the sinkers upon the yarns. The just repeated reference to features of the invention would not alone serve to effect plain plating when tension or excess tension is imposed upon the yarn B, the ensuring of the yarn W appearing on the outer face of the fabric in plain plated areas being brought about by reason of the binding of the yarns between the descending needle and edge 15 of the sinker as illustrated in Fig. 12, which binding must occur before the tensioned yarn B can crowd the yarn W from its position adjacent to the bill of the hook and itself assume the position of the yarn W illustrated in Fig. 12. In other words, the primary object of the invention is accomplished by reason of a binding engagement between a needle and sinker, Fig. 12, while the yarns are maintained in a somewhat separated relation horizontally, such horizontal separation being due in part to the initial horizontal separation illustrated in Figs. 8 and 18, and to a greater extent to the resultant horizontal separation effected by the described rolling of the yarns by the advancing sinker nibs, such rolling being made possible by vertical separation of the yarns.

The hereinbefore described sinker movements may be effected by selection of the jacks 5 in the manner similar to that shown in the Lawson Patent #2,052,777, which selection and subsequent actuation of jacks 5 have the effect of moving the butts 13 of selected sinkers forwardly as indicated in Fig. 3, the non-selected sinkers moving in the manner indicated in Fig. 2 to effect plain plating as illustrated in Figs. 11–14. When effecting plain plating, the sinkers are advanced to the positions shown in Figs. 9, 11, 12 and 13 by cam surface 10' of the cam 10, Fig. 2, the extreme inward position of the sinkers illustrated in Fig. 14 being determined by the point 17 of the cam 10, the point 18 of the cam 19 effecting a further inward movement of the sinkers to effect the knocking of the previously drawn stitches over the sinkers in the usual manner.

Figure 10:
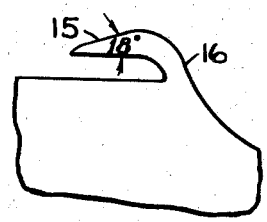
Fig. 10 is a fragmentary, enlarged view of a sinker emphasizing the angular relation of the upper edge of the sinker nib over which the yarns are drawn in effecting plain or normal plating.

As illustrated in Fig. 10, the angle of the edge 15 of the nib of the sinker with respect to the horizontal is, preferably, substantially eighteen degrees although this angular relation may be varied within limits, satisfactory operation of the sinkers and satisfactory results being obtainable with a variation of two degrees either way, i. e., from sixteen degrees to twenty degrees, and fairly satisfactory results are obtainable through a range of fourteen degrees to twenty-two degrees; however, if the angle is too steep, i. e., exceeds twenty-two degrees or thereabouts, difficulty is experienced in effecting a movement of the yarns over the top of the nib of the sinkers from that shown in Fig. 11 to that shown in Fig. 14, that is, without placing undue strain upon the yarns and possibly breaking the same. Each of these sinker nibs terminates in a point, so-called, that not being a point in the strict sense, but denoting the end of the nib which slopes down to a relatively small dimension.

In Fig. 25 is shown a modified form of sinker which sinker is similar to the sinker shown in Fig. 10 and in other figures of the drawings, insofar as the sinker nib and general sinker construction is concerned excepting that a horizontal ledge 20 is provided at the rear of the sinker nib, said ledge serving to provide a horizontal edge over which the yarns are drawn. The said ledge 20 is of considerable importance especially when knitting heels and toes over the backs of sinker nibs in which case even though (during reciprocations of the needle cylinder and sinker head with respect to the cams for the sinkers) the two sinker cams 11 and 19 act upon the sinkers to move them inwardly different distances so that when the heel and toe yarn is being drawn over the backs of the sinker nibs during reverse strokes of the sinkers, the sinkers during a stroke in one direction are in a position forwardly of their position when moving in the reverse direction. Obviously the provision of the downwardly and outwardly sloping edge at the back of the sinker nib as illustrated in Fig. 10, may lead to the drawing of stitches of unequal length during forward and reverse strokes of the cylinder and sinker head in the knitting of heels and toes by virtue of the said downwardly inclined edge at the back of the sinker nibs over which the heel and toe yarn is drawn and variation in the inward movement of the sinkers during such forward and reverse movements of heel and toe knitting. The horizontal ledge 20 avoids the drawing of longer stitches during one stroke of the needle cylinder and sinkers as compared with the length of stitches drawn during the reverse movements of the needle cylinder and sinker head, as the said heel and toe yarn in either case would be drawn by the needles and sinkers at the same level thus effecting the knitting of stitches of the same length during movements of the needle cylinder and sinker head in both directions even though the sinkers during their movement in one direction of heel and toe knitting are forwardly of their position when moving in the other direction.

The conditions that may lead to unequal throw of sinkers during reverse strokes of heel and toe knitting may result: from maladjustment of the screws (not shown) for engaging the bumper post (not shown); from the initial setting of one of the cams 11 and 19 in a position somewhat forwardly of the other; and from subsequent uneven wear on the cams 11 and 19.

Although for convenience of illustration, latch needles have been shown, other than latch needles are equally applicable; and, furthermore, the sinkers may be replaced by other needle cooperating instrumentalities, the desired results being obtained by any binding or holding of the yarns, such binding of the yarns to occur before the yarns are in such a close relation that the excess tensioned yarn may displace the other in the needle hook.

Although for convenience of illustration all of the sinkers have been shown in Figs. 2 and 9 as moving in a path to effect plain plating and all of the sinkers in Fig. 3 have been shown as moving in a path to effect reverse plating, it is evident that the sinkers can be selected so that any of the sinkers may move to effect either plain plating or reverse plating at will. To effect reverse plating at any given wale in any course of knitting, the jack 5 pertaining to the sinker 2 that determines the plating relation at the said given wale, is acted upon by a plunger or cam 14 in the manner disclosed in Patent #2,052,777, so as to cause the butt 5' of the jack to be acted upon as illustrated in Fig. 5, continued rotation of the needles and sinkers causing the butt 5' of the said selected jack to assume the level indicated by the dot and dash line, Fig. 6, and to be engaged by that portion of the cam 8, Fig. 3, indicated by the numeral 8'. Such engagement of the jack by the cam portion 8' advances the jack which moves its sinker forwardly as illustrated in Fig. 3 to effect reverse plating. Conversely when the jack 5 is not acted upon as illustrated in Fig. 5, said jack moves along in a retracted position as illustrated in Figs. 4 and 6 and as disclosed in Patent #2,052,777, as a consequence of which the sinkers are not advanced but move as indicated in Fig. 2 whereupon so-called normal or plain plating is knitted.

In another aspect, the broad purposes of the invention are satisfied by binding the yarns in any manner at such a point in the knitting cycle as to prevent a sinker or other instrumentality where reverse plating is to be effected from causing the reverse plating to extend beyond the intended wale and especially to a wale knitted prior to the wale where reverse plating is effected.

From the standpoint of the method or fabric, applicant is the first to knit plated and reverse stitches of the same length when sinker or other instrumentalities are employed to effect reversal of the yarns in conjunction with the needles, e. g., to draw yarns either for plain plating, Fig. 14, or for reverse plating, Fig. 21, over the sinkers or sinker-like instrumentalities at substantially the same point either on the downwardly or outwardly inclined edges 16 or 20.

In the preceding description the invention has been described with reference to specific parts and combinations thereof without, however, intending to limit the invention to the precise details of construction and combinations shown. Furthermore, the desired result can be obtained without recourse to sinkers and sinker-like instrumentalities, i. e., so long as a binding of the yarns by the needle occurs before the excess tension imposed upon one yarn can effect a relative displacement of the yarns, and so long as the yarns are bound by a needle where plain plating is to be effected before other forces can disturb the desired plating relation of the yarns, the desired object of the invention is obtained.

For convenience of description, the relations of the yarns as knitted in accordance with the arrangement illustrated in Figs. 11–14 has been referred to as normal or plain plating whereas the knitting as effected by the arrangement illustrated in Figs. 18–21, has been referred to as reverse plating. However, the terms plain and normal plating on the one hand and reverse plating on the other hand are relative and are not intended as restricting the invention.

I claim:

1. A knitting machine having independent needles and sinker-like instrumentalities, said instrumentalities each having a nib defining a throat thereunder, the nibs being characterized by having a downwardly and inwardly inclined upper edge, means for feeding two yarns to the needles and in a plating relation, means for moving some of the sinker-like instrumentalities so that yarns are drawn over the downwardly and inwardly inclined edges of the nibs which, in cooperation with an adjacent needle, bind the yarns and prevent an adjacent and following sinker-like instrumentality where the plating relation of the yarns is reversed, from disturbing the plating relation in the hook of the needle first mentioned.

2. An independent needle knitting machine having needles and sinker-like instrumentalities having nibs and means for feeding two yarns to the needles, the sinker-like instrumentalities being constructed and controlled to effect the knitting of plated stitches in which the plating relation is reversed, means for selectively controlling the sinker-like instrumentalities to effect either kind of plating and means acting upon all of the sinker-like instrumentalities to move them to such a relative position with respect to the needles that the said needles as they move to stitch drawing position draw both kinds of plated stitches over the nibs of the sinker-like instrumentalities at substantially the same elevation so that substantially the same length of stitch is drawn by the needles for either kind of plating.

3. An independent needle knitting machine having needles and sinker-like instrumentalities having nibs and means for feeding two yarns to the needles, the sinker-like instrumentalities having downwardly and inwardly inclined edges and downwardly and outwardly inclined edges to effect the knitting of plated stitches and other stitches in which the plating relation is reversed, means for selectively controlling the sinker-like instrumentalities to effect either kind of plating and means acting upon all of the sinker-like instrumentalities to move them to such a relative position with respect to the needles that the said needles as they move to stitch drawing position draw both kinds of plated stitches over the nibs of the sinker-like instrumentalities at substantially the same elevation so that substantially the same length of stitch is drawn by the needles for either kind of plating.

4. An independent needle knitting machine having needles and sinker-like instrumentalities and means for feeding two yarns to the needles, the sinker-like instrumentalities having nibs and downwardly and inwardly inclined edges thereon and being constructed and controlled to effect the knitting of plated stitches and other stitches in which the plating relation is reversed, means for selectively controlling the sinker-like instrumentalities to effect either kind of plating and means acting upon all of the sinker-like instrumentalities to move them to such a relative position with respect to the needles that the said needles as they move to stitch drawing position draw both kinds of plated stitches over the nibs of the sinker-like instrumentalities at substantially the same elevation so that substantially the same length of stitch is drawn by the needles for either kind of plating.

5. A method of knitting, with at least two yarns, a fabric having a plated area and another area in which the plating is reversed, said method including the knitting of one of the said plating areas by causing tension or excess tension to be placed upon one of the yarns but not the other and knitting the yarns in such a manner that in said plated area last mentioned the yarn on the outside of the fabric is a yarn other than the yarn having tension or excess tension applied thereto so that, in said area, the longer loops of the yarn not knitted by excess tension cover the loops of the tensioned yarn, and knitting the other plated area in such a manner that the tensioned yarn appears on the outer face of the fabric, such tension closing the loops of the said tensioned yarn to such an extent as to cause the tensioned yarn to conceal the other yarn in the said other plated area.

6. A method of knitting, with at least two yarns, a fabric having a plated area and another area in which the plating is reversed, said method including the knitting of one of the said plating areas by causing tension or excess tension to be placed upon one of the yarns but not the other and knitting the yarns in such a manner that in said plated area last mentioned the yarn on the outside of the fabric is a yarn other than the yarn having tension or excess tension applied thereto so that, in said area, the longer loops of the yarn not knitted by excess tension cover the loops of the tensioned yarn, and knitting the other plated area in such a manner that the tensioned yarn appears on the outer face of the fabric, such tension closing the loops of the said tensioned yarn to such an extent as to cause the tensioned yarn to conceal the other yarn in the said other plated area, the drawing of the loops for the two kinds of plated areas being effected in such a manner as to cause the stitches in the two differently plated areas to be of substantially the same length.

7. An independent needle knitting machine having needles and sinker-like instrumentalities which cooperate in the knitting of plated stitches, said sinker-like instrumentalities having nibs said nibs each having a downwardly and inwardly inclined edge, means for feeding two yarns to the needles in a plating relation, and means for acting upon the sinker-like instrumentalities to advance them and thereby cause the downwardly and inwardly inclined edges on advanced sinker nibs to engage one of the yarns and move the same with relation to the other and thereby ensure the desired plating relations of the yarns in the knitted fabric.

8. An independent needle knitting machine having needles and sinker-like instrumentalities which cooperate in the knitting of plated stitches, said sinker-like instrumentalities having nibs said nibs each having a downwardly and inwardly inclined edge, means for feeding two yarns to the needles in a plating relation, and means for acting upon the sinker-like instrumentalities to advance them and thereby cause the downwardly and inwardly inclined edges on advanced sinker nibs to engage one of the yarns and move the same with relation to the other and thereby ensure the desired plating relations of the yarns in the knitted fabric, each of said sinker-like instrumentalities also having a downwardly and rearwardly inclined edge, and means for moving the sinker-like instrumentalities to engage one of the said yarns and move the same with respect to the other and thereby reversely position the yarns to ensure the desired reverse plating relations of the yarns in the knitted fabric.

9. An independent needle knitting machine having needles and the sinker-like instrumentalities and means for feeding two yarns to the needles, the sinker-like instrumentalities having nibs characterized by downwardly and inwardly inclined edges and downwardly and outwardly inclined edges to effect the knitting of plated stitches and other stitches in which the plating relation is reversed, means for selectively controlling the sinker-like instrumentalities to effect either kind of plating and means acting upon all of the sinker-like instrumentalities to move them to such a relative position with respect to the needles that the said needles as they move to stitch drawing position draw all stitches over nibs of the sinker-like instrumentalities and over a surface at substantially a single elevation.

10. A knitting machine having needles and instrumentalities cooperating therewith to effect the knitting of two yarns in such a manner that some of the stitches are knitted with two yarns in one plating relation and other stitches are knitted with the yarns in a reverse plating relation, means including sinker-like instrumentalities each having a sinker nib defining a throat to effect the knocking over of previously drawn stitches, said nibs each having a downwardly and inwardly inclined upper edge to provide a relatively high edge to cooperate with a needle and prevent a tensioned yarn displacing the other yarn in the hook of the needle, in combination with means for so timing the movements of the needles and sinker-like instrumentalities as to cause a needle to bind the two yarns between itself and the said downwardly and inwardly inclined upper edge of a companion sinker-like instrumentality to prevent the two yarns being relatively displaced from their desired plating relationship.

11. A knitting machine having needles and instrumentalities cooperating therewith to effect the knitting of two yarns in such a manner that some of the stitches are knitted with two yarns in one plating relation and other stitches are knitted with the yarns in a reverse plating relation, means including sinker-like instrumentalities each having a sinker nib defining a throat to effect the knocking over of previously drawn stitches, said nibs each having a downwardly and inwardly inclined upper edge to provide a relatively high edge to cooperate with a needle and prevent a tensioned yarn displacing the other yarn in the hook of the needle, the sinker-like instrumentalities each having a downwardly and outwardly inclined edge to reverse the plating of the yarns, in combination with means for so timing the movements of the needles and sinker-like instrumentalities as to cause a needle to bind the two yarns between itself and the said downwardly and inwardly inclined upper edge of a companion sinker-like instrumentality to prevent the two yarns being relatively displaced from their desired plating relationship.

12. A knitting machine having needles and instrumentalities cooperating therewith to effect the knitting of two yarns in such a manner that some of the stitches are knitted with two yarns in one plating relation and other stitches are knitted with the yarns in a reverse plating relation, means including sinker-like instrumentalities each having a sinker nib defining a throat to effect the knocking over of previously drawn stitches, said nibs each having a downwardly and inwardly inclined upper edge to provide a relatively high edge to cooperate with a needle and prevent relative displacement of the two yarns in the hook of the needle, in combination with means for so timing the movements of the needles and sinker-like instrumentalities as to cause a needle to bind the two yarns between itself and the said downwardly and inwardly inclined upper edge of a companion sinker-like instrumentality to prevent the two yarns being relatively displaced from their desired plating relationship.

13. A knitting machine having needles and instrumentalities cooperating therewith to effect the knitting of two yarns in such a manner that some of the stitches are knitted with two yarns in one plating relation and other stitches are knitted with the yarns in a reverse plating relation, means including sinker-like instrumentalities each having a sinker nib defining a throat to effect the knocking over of previously drawn stitches, said nibs each having a downwardly and inwardly inclined upper edge to provide a relatively high edge to cooperate with a needle and prevent relative displacement of the two yarns in the hook of the needle, the sinker-like instrumentalities each having a downwardly and outwardly inclined edge to reverse the plating of the yarns, in combination with means for so timing the movements of the needles and sinker-like instrumentalities as to cause a needle to bind the two yarns between itself and the said downwardly and inwardly inclined upper edge of a companion sinker-like instrumentality to prevent the two yarns being relatively displaced from their desired plating relationship.

14. A sinker or web holder for circular, independent needle knitting machines having a nib terminating in a point for controlling the knitting of two yarns in plated and in reverse plated relation, the said nib having stitch drawing edges, one of which slopes downwardly and forwardly in a straight line toward the point of said nib and the other stitch drawing edge of which slopes downwardly and rearwardly.

15. A sinker or web holder for a circular, independent needle knitting machine having a throat, a nib disposed above said throat and terminating in a point, said nib being so constructed as to have two stitch drawing edges at its upper surface, one of said edges sloping downwardly and in a straight line toward the point of said nib and making an angle of substantially 18 degrees with respect to the throat of the sinker and the other stitch drawing edge of which extends rearwardly of the sinker and slopes downwardly to the back of the nib and behind the said throat.

16. A sinker or web holder for circular, independent needle knitting machines having a horizontally disposed throat, a nib above said throat and terminating in a substantially pointed end and having at its upper surface stitch drawing edges extending from and sloping downwardly from the topmost part of the nib, one of said edges sloping forwardly and in a straight line toward the point of the nib and making an angle of substantially 18 degrees with respect to the horizontal throat of said sinker and the other said edge sloping from the highest point rearwardly and downwardly in back of the sinker throat.

ARTHUR N. CLOUTIER.